Dec. 23, 1958     K. J. AVERSTEN     2,866,076
PORTABLE WELDER

Filed June 14, 1955     2 Sheets-Sheet 1

INVENTOR
KARL J. AVERSTEN,

BY *Larson and Whiting*

ATTORNEYS

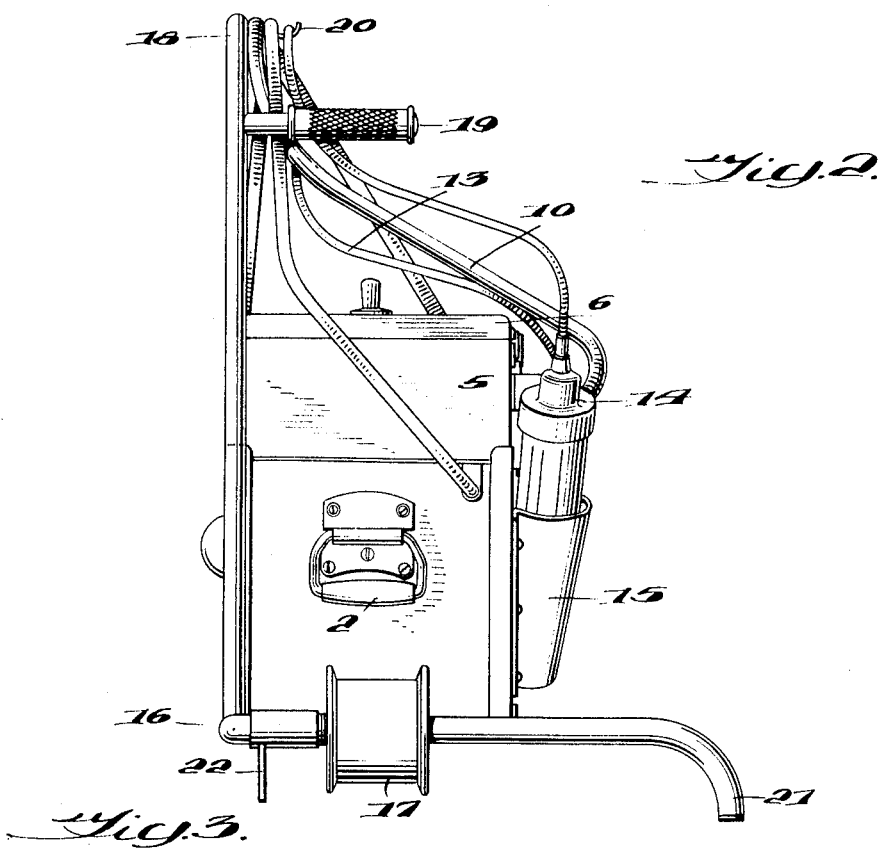
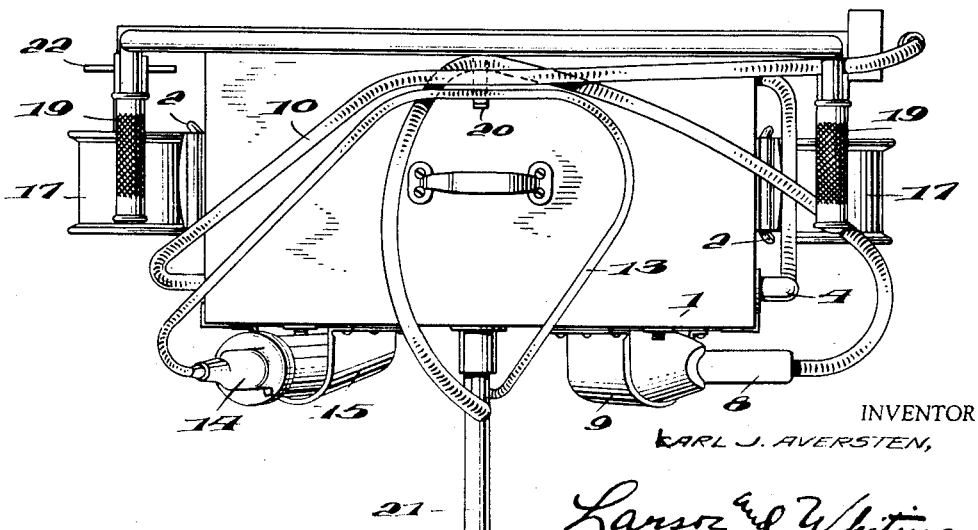

United States Patent Office
2,866,076
Patented Dec. 23, 1958

2,866,076
PORTABLE WELDER

Karl Joel Aversten, Lidingo, Sweden, assignor to Svenska Aktiebolaget Gasaccumulator, Lidingo, Sweden, a corporation of Sweden Application June 14, 1955, Serial No. 515,383

3 Claims. (Cl. 219—98)

This invention relates to an electric arc welding apparatus and more particularly to such an apparatus which is specially designed for transportation on a rail to be used in connection with welding or soldering studs, bolts or the like. Specifically, the invention is useful in connection with welding or soldering connectors between rail ends on railroad lines.

The present invention provides a compact portable device which contains all of the equipment required in electric arc processes. The device is provided with a pair of wheels to run along a rail and is so designed that the area between the wheels is under the center of gravity of the device so that it is balanced and easy to move. The equipment is provided with handle means conveniently arranged for the use of the operator.

A primary object of the present invention is to provide a compact portable device which contains all of the equipment required in electric arc techniques.

Another object of the present invention is to provide an electric arc apparatus which is mounted in a portable carrier and may easily be transported on a rail.

Other objects and many of the attendant advantages of the present invention will become apparent upon consideration of the following detailed specification when considered in connection with the accompanying drawings wherein:

Fig. 2 is a top plan view thereof.

Figure 1:
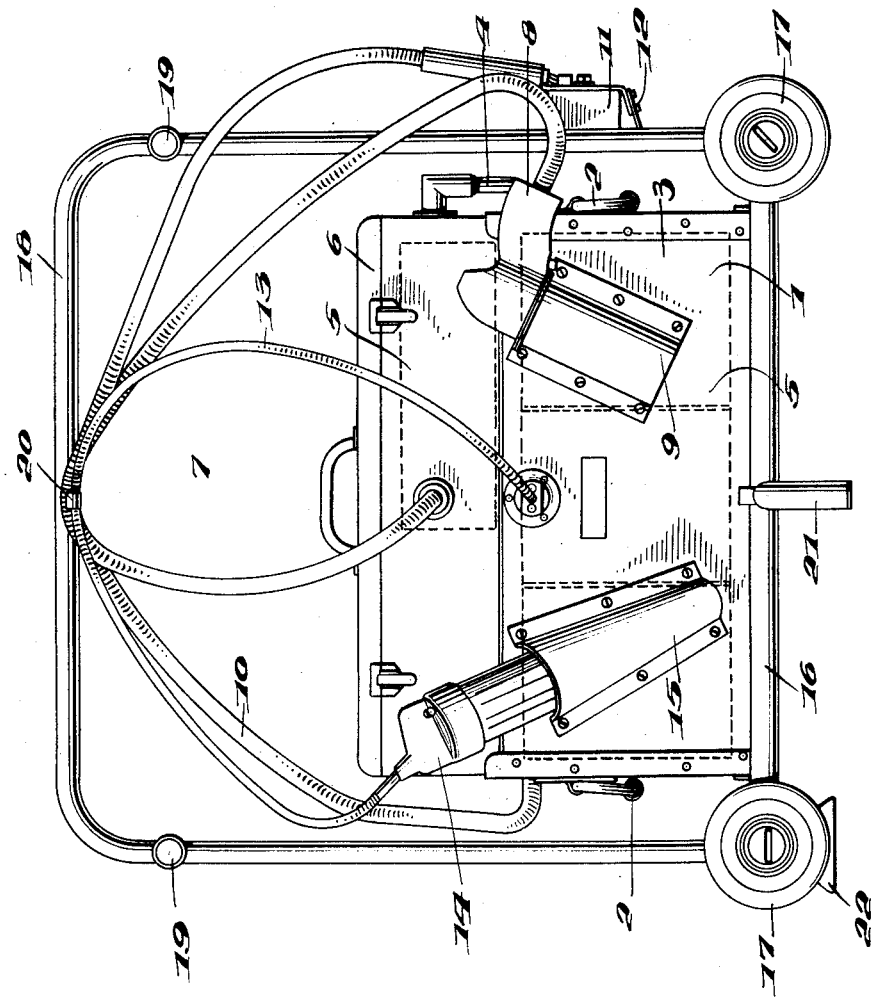
Fig. 1 is a side elevational view of the present invention.

Referring now to the drawings wherein like numerals indicate like parts throughout the several views there is shown at 1 a rectangular box having a handle 2 mounted on each end thereof. Disposed within the rectanguler box is a group of batteries 3 which are connected together in any suitable fashion and are provided with a conductor 4 leading from one end of the box. The conductor 4 connects with a current regulator generally shown at 5 which may be of any suitable type such as, for example, that described in Patent No. 2,661,428. The current regulator 5 is disposed within a box 6 having a hinged lid thereon. The current regulator fills only a portion of this box leaving a comparatively large area to serve as storage space for tools and the like. The box 6 is supported as shown by means of upwardly-extending corner brackets surrounding box 1. The current regulator 5 is provided with a single conductor 7 extending therefrom which conductor leads to a welding pistol 8. The welding pistol may be of the usual variety and is supported on the box 1 by means of a U-shaped plate 9 secured to the outside of the battery box. Also extending from the battery box 1 is a cable 10 having a magnetic shoe 11 and scraper 12 mounted on the end thereof. Since the magnetic shoe 11 is of magnetic material this member may be supported on the metallic battery box at any convenient location. There is also connected to the batteries a cable 13 which connects with an electrically operated grinder 14. The grinder 14 is supported in a U-shaped bracket member 15 as shown.

The battery box and all of the equipment attached thereto is supported by a rigid frame 16 which has single flanged wheels 17 mounted on each end thereof. The wheels 17 are mounted in such a manner that the area therebetween is located under the center of gravity of the welder. Thus the entire structure may be, in effect, balanced on the two wheels 17. The frame 16 is further provided with a U-shaped handle member 18 on one side thereof. The handle member 18 is provided with a pair of handlebars 19 as shown. Centrally located on the handle member 18 is a bracket 20 which supports all of the cables in the manner shown. A supporting bar 21 extends from the side of frame 16 opposite to the side on which the handle members are mounted. There is also provided on one of the wheels 17 a pivoted support 22 which when in the extended position as shown in Fig. 1 extends downwards to a level below the level of wheels 17.

The welding equipment described is particularly well suited for performing minor welding or soldering operations on rails, such as the soldering of connector bars for rail ends. When it is desired to move the welder to a welding location, it is placed with the wheels 17 on one of the rails of the line. The welder is in balance and may be pushed by gripping the handle member 18, the operator moving beside the rail. Since the center of gravity of the welder is directly above the rail, very little effort is required to balance the device. When the location is reached at which the welding operation is to be performed, the welder is tilted until the support 21 touches the ground so as to both support the welder and prevent movement thereof along the rail. The scraper 12 may then be used to scrape the rail clean and the magnetic shoe is placed on the rail. This magnetic shoe serves as a ground connection for the batteries. The grinder 14 may be used for cleaning the welding point if this is necessary. The welding pistol 8 is then taken out of the pocket 9 and is used to perform the welding or soldering operation. If a train should come, the entire device is easily lifted aside by the operator gripping the hand grips 19 and lifting the welder from the rail. When the welding operation is concluded, the parts may be put back into the position shown in Fig. 1 and the welder moved to the next point of operation. When transporting the welder on a car platform or to and from the rail, the pivotal support 22 on wheels 17 is folded down so that the welder is supported on the supports 21 and 22 and by the wheel 17 at the right hand end of the device as viewed in Fig. 1.

Obviously many modifications and variations of the present invention are possible in the light of the above teachings without departing from the spirit of the invention as defined in the appended claims.

What is claimed as new and desired to be secured by Letters Patent is:

1. A transportable electric arc welding apparatus including batteries as current source, a current regulator and a welding gun comprising a rigid frame, a pair of wheels mounted in line on said frame to run on and support the apparatus on one rail, means mounting the welding apparatus on said frame so that the area between the wheels is beneath the center of gravity of the apparatus and with the current regulator on the top of the batteries and a handle means upwardly projecting mounted at one side of said frame for balancing and wheeling of the welding apparatus on a rail.

2. An apparatus according to claim 1 further including a rectangular box adapted to receive the batteries, said box being located wholly between said pair of wheels and with the bottom thereof level with the axis of said wheels and said box carrying on the top thereof a further detachable box containing the current regulator and on the side thereof a holder for detachably carrying said welding gun.

3. An apparatus according to claim 1 further including a support mounted on said frame substantially at the midpoint thereof, said support projecting sidewards and downwards and adapted to rest on the ground to support the welder when stationary.

References Cited in the file of this patent

UNITED STATES PATENTS

| | | |
|---|---|---|
| 950,033 | Sturdevant | Feb. 22, 1910 |
| 950,784 | Neff | Mar. 1, 1910 |
| 1,334,691 | Dahlstrom et al. | Mar. 23, 1920 |
| 2,479,705 | True | Aug. 23, 1949 |

FOREIGN PATENTS

| | | |
|---|---|---|
| 567,696 | Great Britain | Feb. 27, 1945 |